Figure 10:
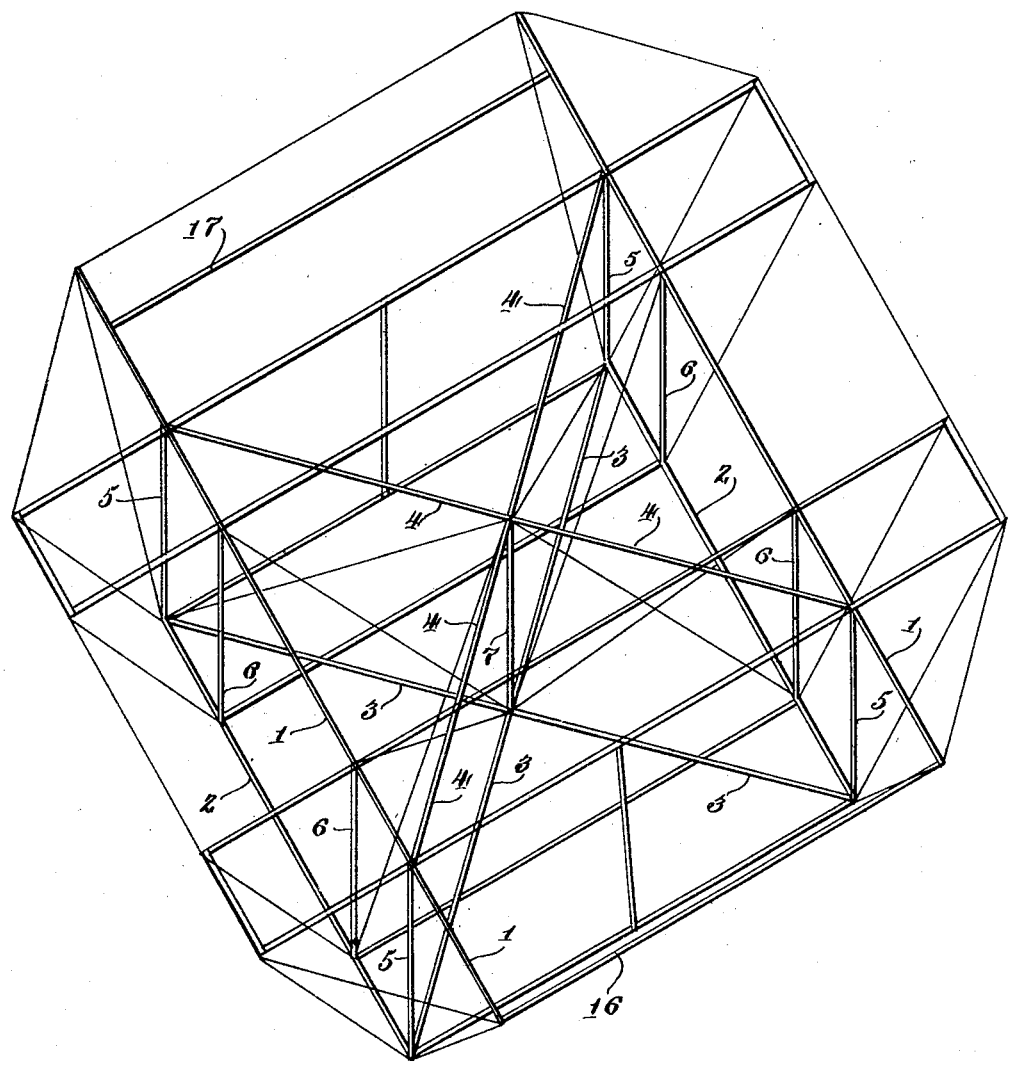

Jan. 3, 1933.     H. TEBBS     1,892,910
AIRCRAFT
Original Filed Aug. 12, 1929     4 Sheets-Sheet 1
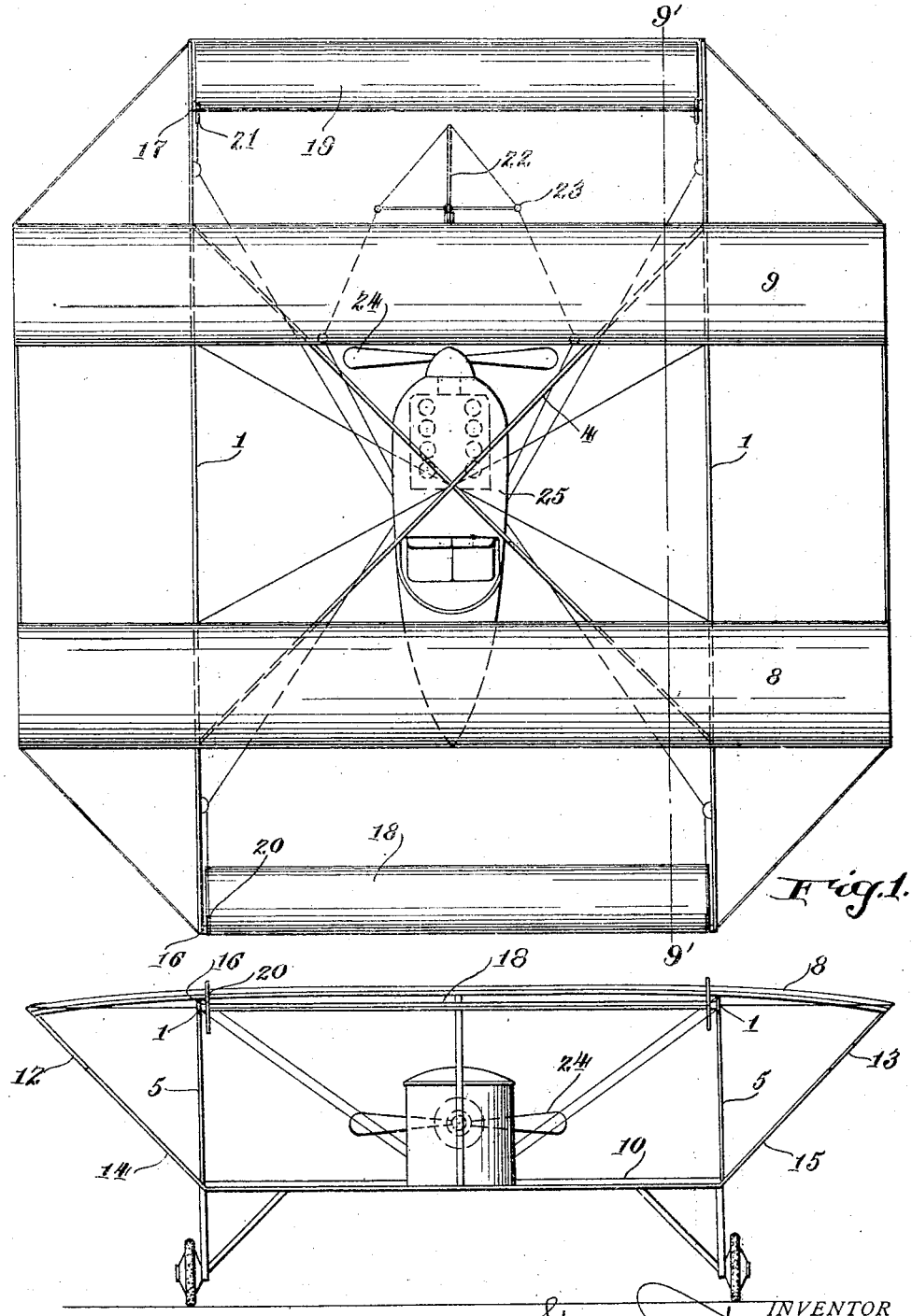

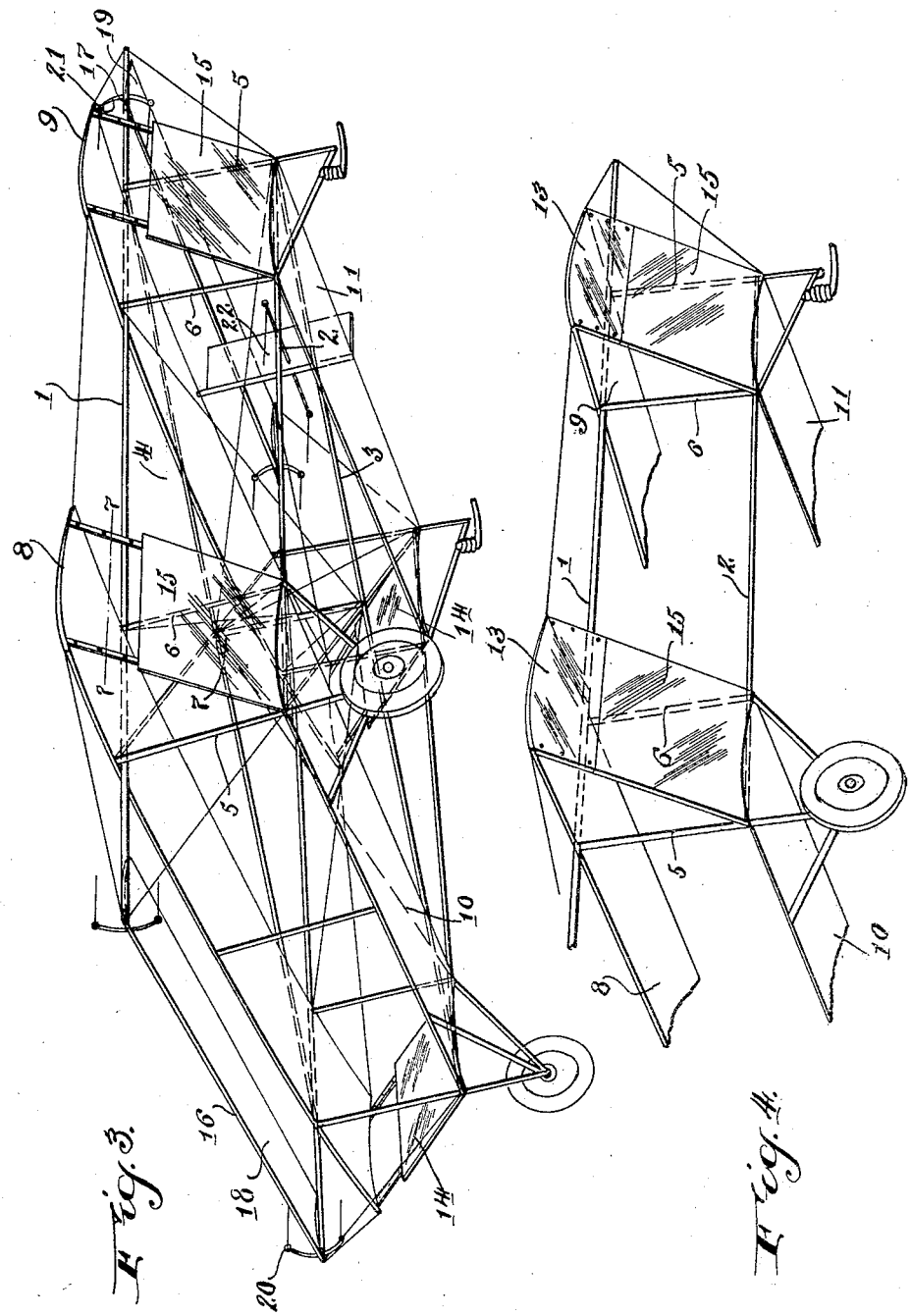

Jan. 3, 1933.   H. TEBBS   1,892,910
AIRCRAFT
Original Filed Aug. 12, 1929    4 Sheets-Sheet 3
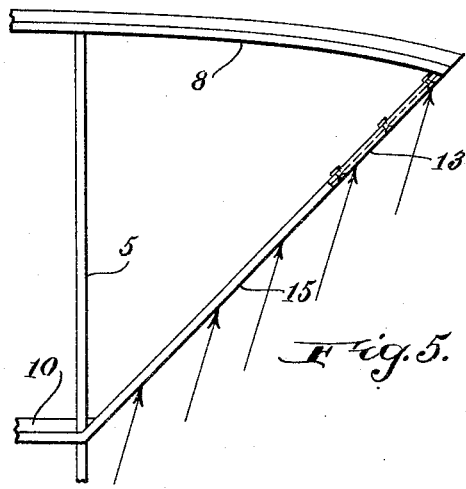
Fig. 5.
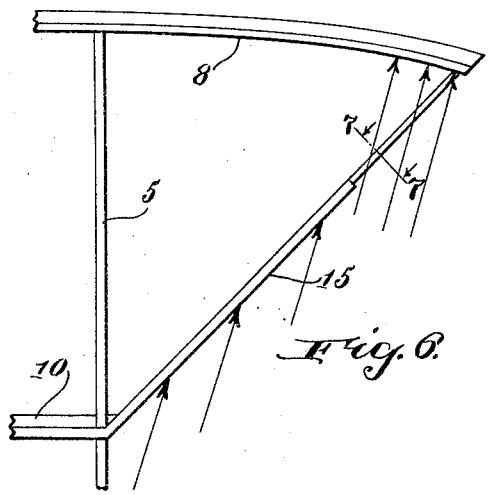
Fig. 6.
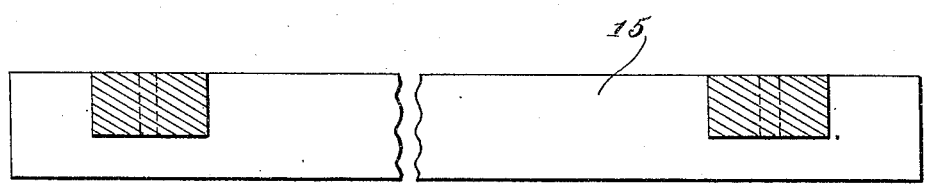
Fig. 7.
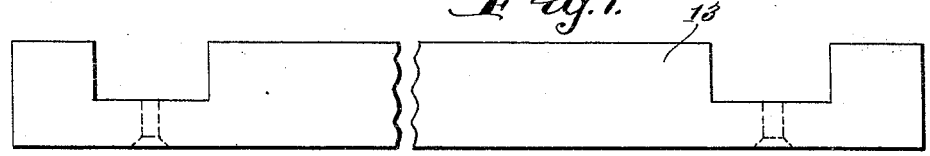
Fig. 8.
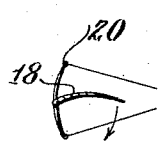
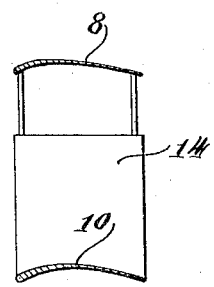
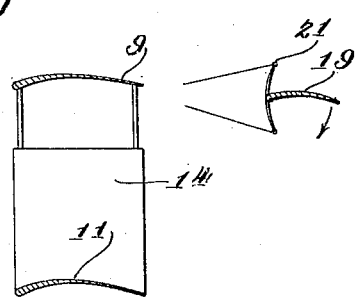
Fig. 9.
INVENTOR
Howard Tebbs
BY
William W. Varney
ATTORNEY Jan. 3, 1933.                H. TEBBS                 1,892,910
                             AIRCRAFT
         Original Filed Aug. 12, 1929    4 Sheets-Sheet 4

Patented Jan. 3, 1933

1,892,910

UNITED STATES PATENT OFFICE

HOWARD TEBBS, OF BALTIMORE, MARYLAND

AIRCRAFT

Application filed August 12, 1929, Serial No. 385,213. Renewed November 22, 1932.

The object of my invention is the construction of an aircraft having natural longitudinal and lateral stability.

A further object of my invention is the providing an aircraft with a plurality of horizontal and dihedral plane resistance acting in correlation.

A further object of my invention is the construction of an aircraft having substantial resistance in every movement except fore and aft directions.

A further object of my invention is the providing of side plane resistance, becoming more pronounced as the aircraft varies from horizontal.

A further object of my invention is the providing an aircraft with fixed planes mutually co-operating to tend to maintain a horizontal position of the aircraft automatically.

A further object of my invention is a new and novel method of bracing an aircraft.

A further object of my invention is a new and novel method of carrying the strains between maximum and minimum in various positions of the aircraft in flight.

A further object of my invention is a new and novel construction involving the placement of the motive power and dead weights in aircraft.

A further object of my invention is my improved control means tending to operate the aircraft from its normal stable position.

A further object of my invention is constructing an aircraft which is provided with tandem bi-planes in its permanent structure acting co-operatively, so that it will present the least resistance to atmospheric currents caused by the bi-planetary surfaces in operation.

In this specification when I use the term level I mean horizontal or when the air is moving horizontally or parallel with the earth.

With the foregoing and other objects in view, my invention consists of the methods employed, combination, and arrangement of systems, apparatus, and means as hereinafter specially provided and illustrated in the accompanying drawings wherein is shown the preferred embodiment of my invention, but it is understood that changes vary and modifications may be resorted to which come within the scope of the claims herewith appended.

In the drawings of the herein described embodiment of my invention, Figure 1 is a plan view of an aircraft embodying my invention. Figure 2 is an end view in elevation of the aircraft, shown in Figure 1, Figure 3 is a perspective view of the aircraft in flight with the removable sections of the dihedral planes removed as will be described later. Figure 4 is a fragmentary perspective view of the aircraft shown in Figure 3 in flight with the removable sections of the dihedral planes in place. Figure 5 is an enlarged end view in elevation of the dihedral plane with the removable section in place showing in a diagraphical way the upward action of the air on the plane. Figure 6 is a similar view to that shown in Figure 5, of the dihedral plane with the removable sections removed thus permitting the air to operate through the opening against the upper plane. Figure 7 is a sectional view taken through the dihedral plane at 7—7 in Figures 3 and 6, the removable sections of the dihedral plane being absent. Figure 8 is a plan view looking down on the edge of the removable section of the dihedral plane. Figure 9 is a sectional view taken through the aircraft on the line 9'—9' of Figure 1 showing the relative position of the horizontal supporting planes, and Figure 10 is a perspective view of the supporting structure of my aircraft substantially isometric.

Similar numerals refer to similar parts throughout the several views.

1 is the main longitudinal struts, 2 is the lower longitudinal struts, 3 is the lower cross brace struts, 4 is the upper cross brace struts, at the end of the lower longitudinal struts 2 are vertical posts 5, extending up to main longitudinal struts 1, 6 are supplementary vertical posts extending from lower longitudinal struts 2 to main longitudinal struts 1 being placed on the inside edge of the supporting planes mentioned hereafter, 7 is the center post extending from the intersection of lower cross brace struts 3 to intersection of upper cross brace struts 4.

Lower longitudinal struts 2 are spaced apart a distance equal to their length, and held in that position by cross brace struts 3 thus forming substantially a lower square frame work for the aircraft. Similarly main longitudinal struts 1 are spaced apart the same distance and secured by upper cross brace struts 4 which are substantially the same length as lower cross brace struts 3, thus forming a substantially equal square structure to one below, but having the ends of the main longitudinal strut 1 extending beyond the point of contact of said brace struts 4 at each end.

The supporting members 8 and 9 on the upper part of the aircraft are secured to main longitudinal struts 1 at approximately the point of juncture of the cross brace struts and extending within from the same. These supporting members in width are one fourth or less than the total distance between the juncture of the cross brace struts with members 1 and 2, thus allowing a distance of two times their width or more between said two supporting members one at each end of the supporting structure. In length these supporting members are equal to the length of the main longitudinal struts 1, and are substantially in length 44 to 26½, relative ratio of upper and lower supporting members 10 and 11, the length of the lower supporting member 10 and 11 extends between lower longitudinal struts 2 and is of the same width as supporting members 8 and 9.

These supporting members have a transverse curvature one in forty, and longitudinally being formed parabolically of a curvature crudely approximated of one to fifteen. Both supporting members 8 and 9 having the highest part of the parabolic towards the forward part of the aircraft.

The lower supporting planes 10 and 11 are substantially straight between lower longitudinal struts 2, but longitudinally of the aircraft have a similar parabolic curvature as the other supporting members 8 and 9.

The dihedral planes are secured to the upper and lower supporting members, and are either substantially straight or swelled to form an easy stream line, in width they are the same as planes 8 and 11, and 10 and 11.

In practice and under certain conditions of load and operative speed conditions, especially in reference to maneuvering it is at times desirable that the area of the dihedral planes be reduced, this is accomplished by removing or detaching the upper sections 12 and 13 of dihedral planes 14 and 15 whereby a decreased area is obtained.

The removal of this portion of the dihedral planes permits the upper planes at their ends to become more active in their lifting and maneuvering power.

The ends of main longitudinal struts 1 are joined together by struts 16 and 17 and to which struts are operatively attached control members 18 and 19. The front control member 18 being fulcrumed to operate in the space between strut 16 and supporting member 8, and is shaped in longitudinal direction of the aircraft of parabolic section area, the highest part being towards the strut 16. Control member 19 is of similar construction as control member 18 and operatively attached to strut 17 the cross-section of said control members being similarly located with reference to struts 16 and 17, respectively, thus giving a double control independent of each other.

Control members 18 and 19 have controlling means 20 and 21 operable within the aircraft.

The main frame is peculiarly braced giving great stress to the structure and its supported load, I brace the center or crossing of the lower cross brace struts to the center or crossing of the upper cross-brace struts, and for practical purposes in order that the aircraft will glide naturally forward to the earth when driving means cease, I locate the center of gravity of the aircraft slightly forward of the center of effort of the aircraft which in substance is at the crossing of the lower cross brace struts positioned horizontally in the aircraft frame. The vertical portion of the center of gravity being between the upper and lower supporting members.

The bracing above referred to goes from the crossing of the lower and upper cross brace struts to the main longitudinal strut members one at a point substantially the inner edge of supporting members 8 and 9, and lower supporting members 10 and 11, as shown on Figure 10. I will not attempt to give them a number as it might confuse the drawings. On the rear of the machine, I have provided a rudder 22 or horizontal steering device hinged or fulcrumed in a vertical plane substantially centrally located longitudinally of the aircraft. With this rudder I provide operating means 23 controlled in the aircraft. This rudder is supported by a post extending from upper supporting plane 9, to lower supporting plane 11, 24 is the propeller as shown in the forward end of the aircraft, this, however, is not the preferred position, but is shown to complete the structure, the propeller is driven from the fuselage 25, as shown. In practice probably the propelling machinery would be a plurality of units properly placed, but the driving mechanism I lay no claim in this application.

I have by experimentation evolved an aeronautic structure formula by which I am enabled to obtain a longitudinal and lateral stability in flight, ascension and landing; this formula is definitely set forth in the dimensions mentioned in this specification and applies to large or small aircraft. I have discovered that material departure from the ratio expressed produce undesirable effects.

I have found in an aircraft, a structure with nacelle or load in the lateral center and extending longitudinally and at the fore and aft ends thereof, extending at right angles in both lateral directions, that supporting surfaces, spaced apart over twice the sum of the breadth of each such supporting surfaces, in tandem upper and tandem lower planetary surfaces, and the upper of ratio of 1 breadth to 7 of width, with an elevation between them of one and one-half of the sum of their breadth, the upper of such plane surfaces to extend laterally beyond the lower to permit a dihedral plane surface to connect with such supporting bi-plane surfaces, at both ends thereof at an angle of approximately 45 degrees, the area of each such dihedral plane to be less than one-half of that of such lower supporting plane surface so attached, the whole structure forming a design with four equal major horizontal planes and lesser dihedral planetary surfaces and an equality at four points of sustention, lift and dihedral planetary resistance.

In this specification and claims, when I use the term, "dihedral supporting member," I means a supporting plane secured at a juncture with another supporting plane attached thereto and and forming an angle therewith.

Having thus described my invention, what I claim and desire to secure by Letters Patent, is:—

1. In an aircraft a structure extending longitudinally and at the fore and aft ends thereof extending at right-angles in both lateral directions and supporting surfaces, said surfaces being spaced apart over twice the width of each of such supporting surfaces, said structure and surfaces being in two series, upper and lower, the breadth of the surface of the upper plane being equal to seven times the width of said plane with an elevation between them of one and one-half times of their width, the upper of such surfaces extending laterally beyond the lower surfaces to permit a dihedral surface to connect with such supporting surfaces at both sides thereof at their ends and at an angle of approximately 45 degrees from the upper surfaces, the area of each such dihedral surface being less than one-half of such lower supporting surface to which it is attached, the whole structure forming a design with four equal major horizontal and four lesser dihedral surfaces, and having four equal areas of suspension, lift and dihedral surface resistance.

2. In an aircraft, a structural formula, comprising a plurality of horizontal supporting members and dihedral surfaces, so spaced to facilitate such aircraft in its functions and more particularly described as a square strut and braced frame to support tandem lower supporting surfaces extending laterally from the fore and aft ends thereof and divided by a space to exceed twice the width of one of said supporting surfaces, and at an elevation of one and one-half times the width of one of said supporting surfaces are placed a second series of supporting surfaces of the same width, each having a breadth of seven times its width and extending laterally beyond said lower supporting surfaces and practically parallel therewith, yet deviating slightly therefrom by a slight elevation in the center and arched in a lateral direction of approximately 1 to 40, the respective lengths permitting the placing of dihedral surfaces at an angle of approximately 135 degrees from the bottom surface at and between the ends of the upper and lower supporting parallel surfaces, each of said dihedral surfaces provided with an area less than one-half of the area of said lower supporting parallel surface to which it is attached, and in the same horizontal plane with the upper supporting surfaces in both fore and aft directions supported by extending struts a guiding means for guiding the aircraft into positive and negative angles of incidence, said guiding means being normally supporting planes in area each less than one-half of the said lower supporting surface, and spaced a distance of twice their width from the upper supporting surface.

3. In an aircraft, a structural formula, comprising a plurality of horizontal supporting members and dihedral surfaces so spaced to facilitate such aircraft in its functions and more particularly described as a square strut and braced frame to support two horizontal lower supporting surfaces extending laterally from the fore and aft ends thereof and divided by a space to exceed twice the width of said supporting surfaces, but not exceeding three times thereof, and at an elevation of one and one-half times the width of said supporting surfaces are placed a second series of supporting surfaces of the same width and in a ratio of 7 in breadth to 1 of width and extending laterally beyond said lower supporting surfaces and practically parallel therewith, but deviating slightly therefrom by a slight elevation in the center and arched in a lateral direction of roughly 1 to 40, dihedral surfaces placed at an angle of approximately 135 degrees to the lower surface between the ends of said upper and lower supporting parallel surfaces, such dihedral surfaces being of an area less than one-half of the area of such lower supporting surface to which it is attached, and in a plane with the upper supporting surfaces in both fore and aft directions and supported by extended struts are provided elevating and depressing members provided with means of controlling or changing their angle of inclination, these members being normally supporting planes and are of an area less than one-half of each of the upper supporting surfaces and in breadth the same as the lower supporting surfaces, said surfaces being spaced a distance of twice their width from the upper supporting surfaces in which plane they are located.

4. In an aircraft, a supporting structure, comprising a plurality of quadrilateral structures provided with cross brace struts superimposed, spacing means or said structures consisting of dihedral struts and vertical posts, and tying means between said structures consisting of diagonal tie members for the four corners of each of the quadrilateral structures to the ends of a mutual post.

5. An aircraft comprising tandem lifting surfaces and structural means for securing them substantially in the same plane area and for spacing them at such a distance from each other that the least interference to their movements will be caused by the air currents arising from the movements of the said lifting surfaces, the structural means comprising horizontal diagonally crossed bracing struts secured together at their points of crossing and to the load, the ends of each of said struts being secured to opposing lifting surfaces; means for supporting a load within the area of said lifting surfaces, said latter means being secured to said structural means at a point near the center of gravity of the aircraft in order to maintain the aircraft in equilibrium; and means operable within the area of the supporting surfaces for effecting changes in the angle of incidence.

6. An aircraft comprising a plurality of pairs of horizontal diagonally crossed bracing struts secured together at their points of crossing, each pair of struts being positioned in different horizontal planetary areas and substantially parallel to each other with their points of crossing in substantially vertical alignment and the plural crossing points being fixed together by a vertical strut; tandem lifting surfaces and structural means for securing them substantially in the same plane area and for spacing them at such a distance from each other that the least interference to their movements will be caused by the air currents arising from the movements of the said lifting surfaces; means for supporting a load within the area of said lifting surfaces, said latter means being secured to said structural means at a point near the center of gravity of the aircraft in order to maintain the aircraft in equilibrium, and means operable within the area of the supporting surfaces for effecting changes in the angle of incidence.

7. An aircraft comprising a plurality of bi-planes and structural means for supporting and spacing them in tandem comprising a plurality of pairs of horizontal diagonally crossed struts secured together at their points of crossing, one pair of which is in a different horizontal plane from the other and in alignment horizontally with each plane of said bi-plane, one pair of said struts being secured by their outer ends to opposing tandem planes and the other pair of said struts being likewise connected to the other tandem plane, and a vertical spacing strut secured to the said pair of parallel horizontal and diagonally crossed struts and to the load; tandem lifting surfaces and structural means for securing them substantially in the same plane area and for spacing them at such a distance from each other that the least interference to their movements will be caused by the air currents arising from the movements of the said lifting surfaces; means for supporting a load within the area of said lifting surfaces, said latter means being secured to said structural means at a point near the center of gravity of the aircraft in order to maintain the aircraft in equilibrium, and means operable within the area of the supporting surfaces for effecting changes in the angle of incidence.

HOWARD TEBBS